Sept. 1, 1964  M. L. KLEIN ETAL  3,146,617
MOISTURE MEASURING SYSTEM
Filed Nov. 25, 1960
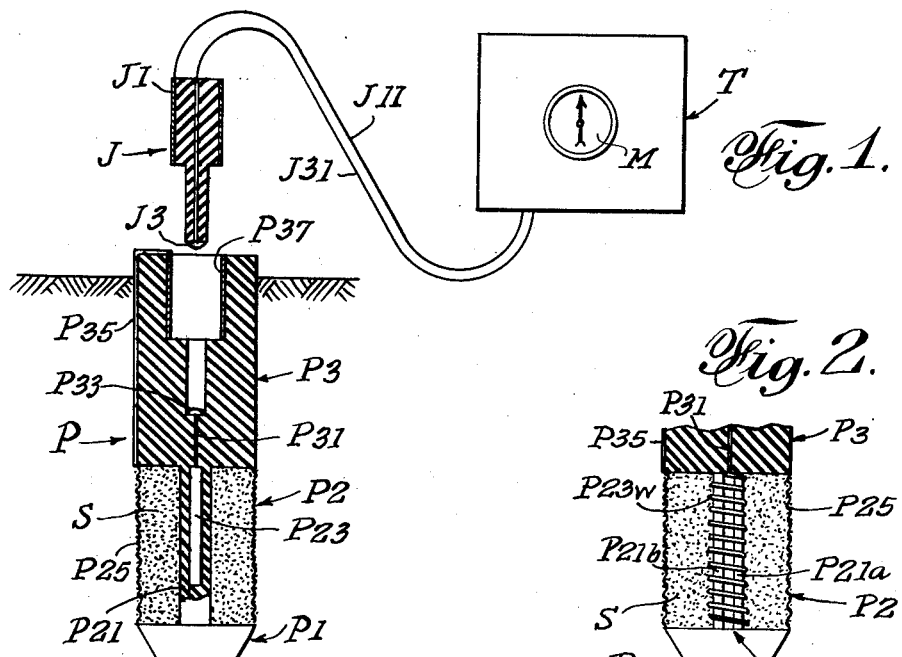
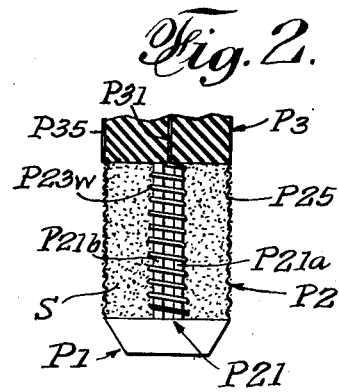
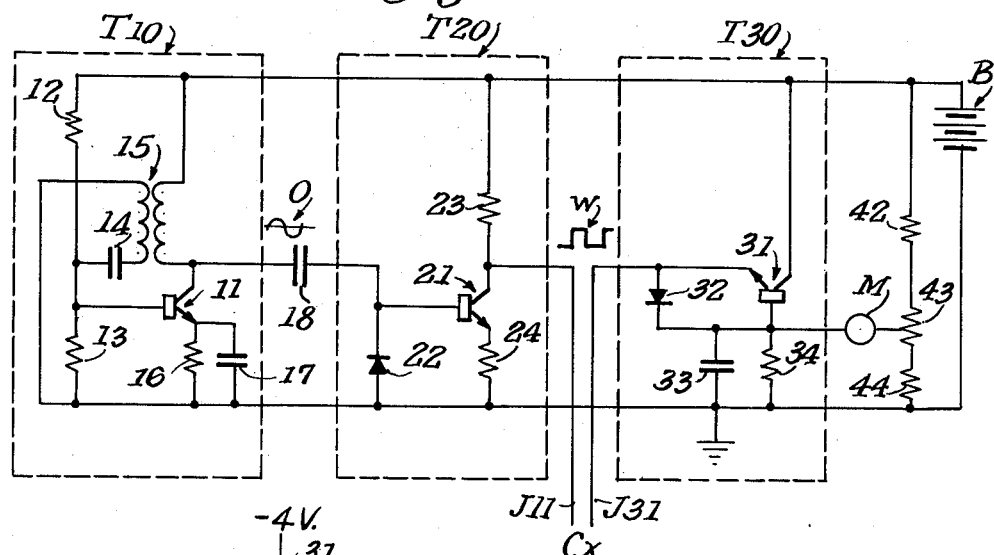
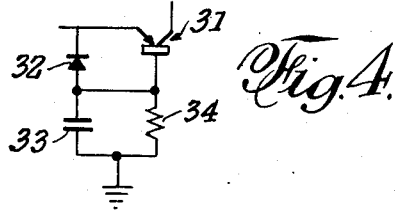
INVENTORS
MARTIN L. KLEIN
ALAN GOUDEY
BY
C. G. Stratton
ATTORNEY

United States Patent Office 3,146,617
Patented Sept. 1, 1964

3,146,617
MOISTURE MEASURING SYSTEM
Martin L. Klein, Woodland Hills, and Alan Goudey, Newhall, Calif., assignors to Dynair Electronics, Inc., a corporation of Delaware
Filed Nov. 25, 1960, Ser. No. 71,553
4 Claims. (Cl. 73—73)

This invention relates to a system and associated components for measuring moisture in soil or other porous media and, more particularly, to the combination of an improved probe which develops a variable capacity in a standard soil as a function of the moisture content thereof, and an electrical translation circuit wherein the variable capacity of the probe is employed to control the development of an output signal which has a linear relationship to the moisture of the soil.

Several types of moisture measuring devices have been available in the prior art. These devices have been used, for example, to control irrigation in order to avoid excessive moisture or dryness. As a rule, the existing moisture measuring devices are inaccurate since most of them do not base the measurement of the moisture in the soil upon a known standard soil. This has resulted in considerable variations in the measurement depending upon the nature of the soil, the alkalinity of the soil, the temperature, and various other factors.

There have been arrangements which base the moisture measurement upon the change of electrical characteristic of a standard soil but these have been unduly complicated and have required weekly maintenance in the case of irrigation control and further were not designed to permit the use of a single electrical measuring instrument to sense a plurality of probes.

Accordingly, the present invention has been developed in order to provide a low power electronic instrumentation means for detecting the moisture content of a soil as measured through a standard soil. In particular, the invention contemplates the use of a probe system wherein a standard soil is contained within a chamber, the surrounding surface of which is a fine mesh screen which permits passage of moisture from the soil to be tested to the standard soil. The standard soil chamber also includes a central supporting member and a center electrode. The standard soil chamber is then connected between a tip connected to the screen and the central supporting member and a body portion which also includes a female connecting member having one electrical connection to the screen and another insulated connection to the central electrode in the standard soil chamber.

According to the present invention a plurality of probes of the above type may be sensed through a single portable electrical instrument which has a sensing jack adapted to fit into the female connecting member of the probe and to provide electrical engagement between the screen and one lead and the center electrode and a second lead. The jack thus provides connections to a variable capacitor formed by the screen-enclosed standard soil chamber.

The invention further contemplates a transistorized electrical translation instrument wherein a first transistor circuit generates an oscillatory signal in the frequency range of 300 to 600 kilocycles per second (455 kc. being a typical example), a second transistor circuit translates the oscillatory signal to a square wave signal of the same frequency, and a third transistor circuit receives the square wave signal through the jack connections to the unknown capacitance of the screen-enclosed standard soil chamber.

The third transistor circuit constitutes an output circuit which translates the square wave signal into an output signal which has a linear relationship to the capacitance of the probe standard soil chamber.

In this general manner the present invention makes it possible to accomplish accurate measurement of moisture in soil or other porous media without the complexity of the probe systems previously required and further while permitting the use of a simple, portable electrical instrument which may be used to sense any one or a plurality of probe installations.

Accordingly it is a general object of the invention to provide improvements in a moisture measuring system.

Another object of the invention is to provide an improved type of control wherein a variable capacity is developed representing the moisture content of a standard soil.

A further object of the invention is to provide a portable electrical translation circuit which is adapted to operate cooperatively with a variable capacity type of probe to develop an output signal having a linear relationship to the capacity measured.

Still another object of the invention is to provide an improved transistor circuit for translating a capacity into an electrical output signal which is linearly representative thereof.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only and are not intended as a definition of the limits of the invention.

FIG. 1 shows a typical arrangement of a system incorporating features of the invention;

FIG. 2 shows an alternative type of center electrode which may be used in probe P of FIG. 1;

FIG. 3 illustrates a suitable transistor circuit for practicing the portable instrument feature of the invention; and FIG. 4 illustrates a modified type of linear translation circuit T30 for the arrangement of FIG. 3.

Reference is now made to FIG. 1 wherein a probe P is shown as it may be arranged in soil where moisture content is to be measured. Probe P is noted to include three sections: a tapered tip P1; a mesh-enclosed chamber containing a standard soil P2; and an upper body portion P3 which contains a female connecting member for receiving a male jack J attached to translation instrument T.

In the example of FIG. 1, section P2 is shown to contain a central supporting member P21 which surrounds a center electrode P23, and serves to connect body section P3 with tip P1. Center electrode P23 is connected via a wire P31 to a center terminal P33 forming part of the female connecting member in body section P3.

The outer portion of chamber P2 is a screen of fine mesh which may, typically have 100 divisions per inch, and is connected electrically via a wire P35 to a circumferential electrode P37 forming part of the female connector for receiving jack J.

Thus probe P provides two electrical outputs through the center terminal P33 and the circumferential terminal P37 in body P3. The remaining portion of body P3 is made of non-conducting material, such as plastic of some type, so that there is no electrical connection between center electrode P23 and screen P25, except the capacity of the standard soil therebetween. It is important in this respect to note that electrode P23 is surrounded by a central supporting member P21 which is also a non-conductor.

The use of a standard soil S in chamber P2 insures that variations in the nature of the soil which surrounds the probe will not affect the capacity of the standard soil which is then dependent only upon the amount of moisture transmitted thereto through screen P25.

Jack J is arranged to have its circumferential sheath J1 contact conductor P37 in body P3 when the jack is inserted into the probe and the center electrode J3 of the jack is arranged to contact electrode P33 of the probe, there being insulation between sheath J1 and electrode J3. Leads J11 and J31 are connected to electrodes J1 and J3 of the jack and provide input connections for translation circuit T which will be discussed in further detail with respect to FIG. 3. A meter M is shown on the face of instrument T to indicate that the output signal of the instrument may be directly displayed as a meter displacement. It will be understood, however, that the invention may be practiced without the use of the meter where the signal developed through circuit T is used for automatic control as, for example, in an irrigation system where the valves controlling water flow may be automatically adjusted in accordance with the signal produced by circuit T.

As an alternative means for center electrode P23 in probe P, another arrangement is shown in FIG. 2. In this figure, support P21 is shown to comprise first and second rods P21a and P21b which are used to connect body P3 to tip P1. The center electrode P23 is then formed by tightly winding insulated wire P23w around rods P21a and P21b.

Wire P23w may then also constitute wire P31 connecting to center electrode P33 of section P3. The purpose of the insulation around wire P23w and the insulation of support P21 in FIG. 1 around electrode P23 shown therein, is to reduce or eliminate any leakage impedance which might result from direct contact of moist soil with the center electrode.

A preferred arrangement for translation circuit T is shown in FIG. 3. In general form this arrangement comprises an oscillator circuit T10, a squaring circuit T20, and an output circuit T30 which develops a signal having a linear relationship to the capacity $Cx$ measured in probe P and passed via jack J and leads J11 and J31 to circuits T20 and T30. The connection of lead J11 to circuit T20 and lead J31 to circuit T30 may be reversed, since it does not matter which electrode of the probe is connected to the output circuit. Thus the mesh screen may just as well be connected via lead J11 to the output circuit T30 with lead J31, in this case being connected to circuit T20, thus connecting the center electrode P23 to circuit T20.

As an illustration of the use of circuit T20, it is shown to be connected to meter M which receives a suitable calibrating signal for initial reading through a circuit including a potentiometer 43 connected through one balancing resistor 42 to the positive terminal of a battery B and connected through a second balancing resistor 44 to the negative terminal of battery B.

Oscillator T10 is shown as comprising a transistor 11 having a base electrode coupled to the junction of resistors 12 and 13, this junction being coupled through a capacitor 14 to the secondary of a feedback transformer 15, the primary of transformer 15 being connected between the plus terminal of battery B and the collector of transistor 11. This arrangement provides oscillatory feedback in a well-known manner. A suitable operating frequency is 455 kilocycles per second.

The emitter of transistor 11 is coupled to the parallel connection of a resistor 16 and a capacitor 17 providing a suitable bias for the oscillator. The output signal of circuit T10 is a sine wave referenced as signal O. Signal O is passed through coupling capacitor 18 to the base electrode of a transistor 21 in square wave signal generator circuit T20.

The base electrode of transistor 21 is also connected to the cathode of a diode or unilateral device 22, the anode of which is connected to the negative terminal of battery B which is assumed, in this example, to constitute ground potential. Diode 22 prevents the potential of transistor 21 from dropping too far on the negative side due to the negative swing of signal O. The collector electrode of transistor 21 is connected through resistor 23 to the plus potential of battery B, and the emitter electrode is coupled through a resistor 24 to ground potential. The arrangement of circuit T20 provides a square wave signal W, as illustrated at the output of circuit T20 having the frequency of signal O, the peak and minimum amplitudes of the signal being set as the saturation and cut-off operating points of transistor 21.

Square wave signal W is applied through unknown capacity $Cx$, derived through probe P in the manner described above, to output circuit T30. During the positive excursion of signal W, current is passed through a diode or unilateral device 32 in circuit T30 to cause the charging of a capacitor 33 which has a discharge path through a resistor 34. During the negative excursions of signal W, transistor 31 is caused to conduct, causing the emitter electrode thereof to assume base potential which corresponds to the voltage across capacitor 33. This then raises the potential across capacitor $Cx$ to correspond to that previously entered into capacitor 33 and thus compensates for the otherwise normal exponential charging rate for a capacitor.

After several periods of the square wave signal W, capacitor 33 assumes an average voltage level where the discharge rate is balanced by the amount of charge restoration through diode 32. This average voltage level is then a direct and linear measurement of the capacity $Cx$. This may be explained simply as follows:

If capacitor 33 is referred to as $Ck$, then the voltage $Ek$ developed across $Ck$ may be expressed in terms of the peak voltage developed by signal W, referred to as $Ew$, as follows:

$$Ek = Cx.Ew/(Ck+Cx)$$

The above relationship may be derived in a straightforward manner from basic electrical principles, being discussed for example, in a book by Robert H. Nass, entitled "Basic Electrical Engineering" and published by the Ronald Press Company, New York, reference being made in particular to pages 172 and 173, relating to the transfer of charges between capacitors.

If capacitor 33 corresponding to $Ck$ is selected to have a capacity which is substantially larger than the expected value of $Cx$ then the above expression becomes:

$$Ek \cong Cx.Ew/Ck$$

This means that there is a substantially linear relationship between the signal $Ek$ which is developed and the unknown capacitance $Cx$, provided that the compensation circuit of the invention is included to insure that the transfer of charge through $Cx$ is not decreased for increasing voltages on capacitor 33.

As an alternative to the arrangement of circuit T30, a PNP type of transistor circuit is shown in FIG. 4. In this circuit, diode 32 is reversed so that the cathode thereof connects to the emitter of transistor 31, the potential applied to the collector of the transistor being negative such as minus four volts (whereas in FIG. 3 battery B may apply plus four volts to the collector of transistor 31). The base of transistor 31 is connected to the anode of diode 32 which is also connected to capacitor 33 as before. Resistor 34 is again in parallel with capacitor 33.

In operation, the negative portion (rather than the positive portion as in FIG. 3) of waveform W, causes the charging of capacitor 33, and the positive period of waveform W, causes forward biasing of transistor 31 and the adjustment of the voltage across $Cx$ to compensate for the changed voltage across capacitor 33, which in this case is charged in a negative sense measuring the voltage from the junction with diode 32 to ground.

From the foregoing description it should now be apparent that present invention provides an improved system for measuring the moisture in porous media, such as soil, where a simple probe arrangement is provided permitting the use of a portable meter or other measuring circuit to sense one or a plurality of probes and to produce a linear signal representation of the capacity developed in the probe and thus a linear representation of the moisture in the soil or other porous media.

It will be understood that while only two basic arrangements of the standard soil chamber P2 have been described herein, several other possibilities exist with different forms of electrodes and materials and where the screen P2 instead of being fine mesh may comprise a finely-wound helix or other type of porous metallic cover.

The transistor circuit arrangements illustrated serve the purpose of producing a linear signal representation of the capacity in the standard soil chamber but do not constitute the only means of accomplishing this purpose.

Accordingly it will be understood that the generic features of the invention in system, as well as component aspects, such as the probe and translation circuit considered separately, are not limited to the specific showings herein but rather fall within the broad generic scope of the appended claims.

Having thus described the invention, what is claimed and desired to be secured by Letters Patent is:

1. A moisture measuring system comprising: a probe including a mesh-enclosed chamber containing a standard soil surrounding a center support member containing a first electrode, the mesh enclosure of said chamber constituting a second electrode with said standard soil constituting a dielectric having a constant which varies in linear relationship with the moisture which is measured, said probe further including a tip attached to said mesh and to said center support member having tapered sides, and a body portion attached to the other end of said center support member and said mesh for supporting said mesh-enclosed chamber and for providing separate electrical paths for signals derived from said first and second electrodes, said body including means for receiving a jack to connect separate sensing leads to said separate electrical paths; and an indicating device having a jack for insertion into said probe body to introduce the capacity of said mesh-enclosed chamber into a measuring circuit, said measuring circuit including first means for generating a standard oscillatory signal, and second means coupled to said first means through said mesh-enclosed chamber capacitance for translating said capacitance into a linearly corresponding electrical output signal.

2. An improved probe for use in a moisture measuring system wherein a meter is provided with a sensing jack having a center and circumferential sensing electrodes, said probe comprising: a chamber for containing a standard soil including a surrounding fine mesh screen and a central supporting member containing a center electrode; a terminating portion connected to one end of said central supporting member and to one end of said screen; and a body portion connected to the other ends of said central supporting member and said screen, said body portion including the female counterpart to said jack with a central portion for receiving a wire connecting to said center electrode and a circumferential portion for receiving a wire connecting to said screen.

3. The probe defined in claim 2 wherein said central supporting member includes a solid electrode surrounded by an insulating material to prevent direct moisture contact with said electrode.

4. The probe defined in claim 2 wherein said central supporting member includes two supporting rods connecting said body to said terminal portion, and insulated wire wound tightly around said rods to constitute said center electrode.

References Cited in the file of this patent
UNITED STATES PATENTS

| | | |
|---|---|---|
| 2,304,448 | Fletcher | Dec. 8, 1942 |
| 2,555,977 | Kline | June 5, 1951 |
| 2,839,644 | Ohlheiser | June 17, 1958 |
| 2,985,827 | Hasenkamp | May 23, 1961 |